United States Patent
Detering et al.

(10) Patent No.: US 9,670,435 B2
(45) Date of Patent: Jun. 6, 2017

(54) COPOLYMERS COMPRISING CARBOXYLIC ACID GROUPS, SULFO GROUPS AND POLYALKYLENE OXIDE GROUPS AS A SCALE-INHIBITING ADDITIVE TO WASHING AND CLEANING PRODUCTS

(75) Inventors: Jürgen Detering, Limburgerhof (DE); Bolette Urtel, Bobenheim-Roxheim (DE); Heike Weber, Mannheim (DE); Roland Ettl, Altlußheim (DE); Torben Gädt, Traunstein (DE); Ewald Heintz, Schweigen-Rechtenbach (DE); Thorsten Bastigkeit, Wuppertal (DE); Thomas Eiting, Düsseldorf (DE); Dorota Sendor-Müller, Düsseldorf (DE)

(73) Assignee: BASF SE, Ludwigshafen (DE)

( * ) Notice: Subject to any disclaimer, the term of this patent is extended or adjusted under 35 U.S.C. 154(b) by 491 days.

(21) Appl. No.: 13/302,593

(22) Filed: Nov. 22, 2011

(65) Prior Publication Data
US 2012/0129750 A1    May 24, 2012

Related U.S. Application Data

(60) Provisional application No. 61/416,305, filed on Nov. 23, 2010.

(51) Int. Cl.
| C08F 220/06 | (2006.01) |
| C08F 228/02 | (2006.01) |
| C11D 3/37 | (2006.01) |
| C08F 220/28 | (2006.01) |
| C08F 220/58 | (2006.01) |

(52) U.S. Cl.
CPC ............ *C11D 3/378* (2013.01); *C08F 220/06* (2013.01); *C08F 2220/286* (2013.01); *C08F 2220/585* (2013.01)

(58) Field of Classification Search
CPC ...... C11D 3/378; C08F 220/06; C08F 228/02; C08F 2220/286
USPC ........ 510/220, 230, 421, 475, 476, 477, 492
See application file for complete search history.

(56) References Cited

U.S. PATENT DOCUMENTS

| 5,039,447 A | 8/1991 | Reuben |
| 5,292,447 A | 3/1994 | Venturello et al. |
| 5,294,362 A | 3/1994 | Venturello et al. |
| 5,422,028 A | 6/1995 | Oakes et al. |
| 6,462,006 B1 | 10/2002 | Sorg et al. |
| 2004/0034511 A1 | 2/2004 | Shibamori et al. |
| 2005/0202994 A1* | 9/2005 | Baum et al. .................. 510/475 |
| 2007/0082831 A1 | 4/2007 | Guzmann et al. |
| 2008/0281053 A1 | 11/2008 | Baum et al. |
| 2010/0065090 A1* | 3/2010 | Tropsch ................. C11D 3/378 134/34 |
| 2010/0294309 A1 | 11/2010 | Tropsch |

FOREIGN PATENT DOCUMENTS

| CN | 101885888 A | 11/2010 | |
| DE | 198 19 187 A1 | 11/1999 | |
| DE | 102 25 794 A1 | 12/2003 | |
| DE | 102007019458 A1 | 10/2008 | |
| EP | 147745 * | 7/1985 | ............... C11D 3/37 |
| EP | 0147745 | 7/1985 | |
| EP | 0 778 340 A2 | 6/1997 | |
| EP | 851 023 A2 | 7/1998 | |
| JP | S60-152600 A | 8/1985 | |
| JP | 2003252666 A | 9/2003 | |
| JP | 2005-272216 A | 10/2005 | |
| WO | WO-02/08527 A1 | 1/2002 | |
| WO | WO-2005/042684 A1 | 5/2005 | |
| WO | WO 2008/132131 * | 11/2008 | ............. C11D 1/825 |
| WO | WO-2008/132131 A1 | 11/2008 | |
| WO | WO-2010/024468 A1 | 3/2010 | |

* cited by examiner

*Primary Examiner* — Brian P Mruk
(74) *Attorney, Agent, or Firm* — Drinker Biddle & Reath LLP

(57) ABSTRACT

The invention relates to copolymers which comprise, in copolymerized form, a1) 30 to 90% by weight of at least one monoethylenically unsaturated $C_3$-$C_8$-carboxylic acid or of an anhydride or water-soluble salt thereof, a2) 3 to 60% by weight of at least one monomer comprising sulfo groups, a3) 3 to 60% by weight of at least one nonionic monomer of the formula (I)

$$H_2C=C(R^1)COO-[R^2-O]_o-R^3 \qquad (I)$$

in which $R^1$ is hydrogen or methyl, $R^2$ are identical or different, linear or branched $C_2$-$C_6$-alkylene radicals which may be arranged in blocks or randomly, and $R^3$ is hydrogen or a straight-chain or branched $C_1$-$C_4$-alkyl radical and o is a natural number from 3 to 50, a4) 0 to 30% by weight of one or more further ethylenically unsaturated monomers which are polymerizable with a1), a2) and a3), where the sum of a1), a2), a3) and a4) adds up to 100% by weight.

15 Claims, No Drawings

COPOLYMERS COMPRISING CARBOXYLIC ACID GROUPS, SULFO GROUPS AND POLYALKYLENE OXIDE GROUPS AS A SCALE-INHIBITING ADDITIVE TO WASHING AND CLEANING PRODUCTS

CROSS-REFERENCE TO RELATED APPLICATIONS

This application claims benefit (under 35 USC 119(e)) of U.S. Provisional Application 61/416,305, filed Nov. 23, 2010 which is incorporated by reference.

BACKGROUND OF THE INVENTION

The invention relates to copolymers comprising carboxylic acid groups, sulfo groups and polyalkylene oxide groups, and to the use thereof as a scale-inhibiting additive to washing and cleaning products, especially to phosphate-containing and phosphate-free detergent formulations for machine dishwashing.

Machine dishwashing should deliver the washed dishes in a residue-free cleaned condition with a faultlessly shiny surface, for which a detergent, a rinse aid and regenerating salt for water softening typically have to be used. "3 in 1" dishwasher detergents were introduced to the market in 2001 and combine the functions of detergent, rinse aid and regenerating salt in one product. In addition to detergent components for removal of the soiling on the ware, they comprise integrated rinse aid surfactants which ensure that water runs off the whole area of the ware during the rinsing and drying cycle, thus preventing scale and water spots. In addition, they comprise components for binding of the hardness-forming calcium and magnesium ions. As a result, there is no need for the consumer to replenish rinse aid and salt in the machine dishwasher. The incorporation of further functions (for example protection from glass corrosion and protection from the tarnishing of silver) led to the development of x in 1 (where, for example, x=6 or 9) or "all in one" products.

Copolymers composed of carboxyl-containing and sulfo-containing monomers have been an important part of phosphate-containing and phosphate-free machine dishwashing detergents for many years. However, the contribution that they make to the detergent and rinsing performance and in particular the contribution that they make to the prevention of scale on the ware is still in need of improvement.

EP-A 0 778 340 describes the use of copolymers of allyl alcohol ethoxylates and acrylic acid in phosphate-free dishwasher detergent compositions.

WO 02/08527 discloses sulfo-containing copolymers, the preparation of the copolymers and the use thereof as an additive to washing, cleaning and rinse aid products. The copolymers comprise (a) 70 to 100 mol % of at least two different monoethylenically unsaturated carboxylic acid monomers and (b) 0 to 30 mol % of one or more nonionic monomers. The sulfo groups are introduced by amidation with an amino-$C_1$-$C_2$-alkanesulfonic acid.

WO 2005/042684 describes the use of specific copolymers of acrylic acid, methacrylic acid and acrylic acid alkoxylates as scale-inhibiting additives in machine dishwashing.

DE 102 25 794 describes the use of sulfo-containing copolymers formed from 30 to 95 mol % of a monoethylenically unsaturated carboxylic acid, 3 to 35 mol % of at least one sulfo-containing monomer and 2 to 35 mol % of a (meth)acrylic acid alkoxylate as a scale-inhibiting additive to washing and cleaning products. In the examples, copolymers formed from (meth)acrylic acid, methoxy polyethylene glycol methacrylate and sulfoethylmethacrylic acid sodium salt are used. In a further example, a binary copolymer formed from acrylic acid and 2-acrylamido-2-methylpropanesulfonic acid is used.

WO 2008/132131 describes the use of sulfo-containing copolymers formed from 30 to 95 mol % of acrylic acid and/or methacrylic acid, 3 to 35 mol % of a sulfo-containing monomer and 2 to 35 mol % of a nonionic monomer of the formula

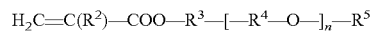

$H_2C=C(R^2)-COO-R^3-[-R^4-O-]_n-R^5$ as a scale-inhibiting additive to machine dishwasher detergents for prevention of the formation of calcium phosphate deposits.

WO 2010/024468 describes the use of copolymers formed from a carboxylate-containing monomer, a sulfonate-containing polymer and an allyl ether or allyl alcohol ethoxylate with 1 to 5 ethylene oxide groups as an additive to washing and cleaning products. A preferred sulfonate-containing monomer is 2-hydroxy-3-allyloxypropanesulfonic acid.

A SUMMARY OF THE INVENTION

It is an object of the invention to provide copolymers which are notable for advantageous use properties, especially for their scale-inhibiting action and wide usability in the machine dishwashing sector, in phosphate-containing and phosphate-free dishwasher detergents.

It is a further object of the invention to provide improved phosphate-containing and phosphate-free detergent formulations for machine dishwashing, which give rise to an improved washing outcome. It is a particular object of the invention to provide such formulations, which give rise to streak-, deposit- and drip-free dishware without use of additional rinse aid.

The object is achieved by copolymers which comprise, in copolymerized form,
 a1) 30 to 90% by weight of at least one monoethylenically unsaturated $C_3$-$C_8$-carboxylic acid or of an anhydride or salt thereof,
 a2) 3 to 60% by weight of at least one monomer comprising sulfo groups,
 a3) 3 to 60% by weight of at least one nonionic monomer of the formula (I)

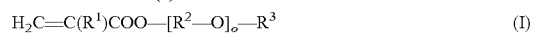

$H_2C=C(R^1)COO-[R^2-O]_o-R^3$     (I)

in which $R^1$ is hydrogen or methyl, $R^2$ are identical or different, linear or branched $C_2$-$C_6$-alkylene radicals which may be arranged in blocks or randomly, and $R^3$ is hydrogen or a straight-chain or branched $C_1$-$C_4$-alkyl radical and o is a natural number from 3 to 50,
 a4) 0 to 30% by weight of one or more further ethylenically unsaturated monomers which are polymerizable with a1), a2) and a3),
where the sum of a1), a2), a3) and a4) adds up to 100% by weight.

The object is also achieved by the use of the copolymers as a scale-inhibiting additive to washing and cleaning products, especially to phosphate-free or phosphate-containing detergent formulations for machine dishwashing.

A DETAILED DESCRIPTION OF THE INVENTION

It has been found that, by adding the inventive copolymers which comprise carboxylic acid groups, sulfo groups and polyalkylene oxide groups to phosphate-containing and phosphate-free machine dishwasher detergents, outstanding cleaning and rinse aid performance and excellent scale inhibition both with respect to inorganic and organic deposits can be achieved.

The object is additionally achieved by a detergent formulation for machine dishwashing, comprising, as components:
a) 1 to 20% by weight of at least one copolymer which comprises, in copolymerized form,
  a1) 30 to 90% by weight of at least one monoethylenically unsaturated $C_3$-$C_8$-carboxylic acid or of an anhydride or salt thereof,
  a2) 3 to 60% by weight of at least one monomer comprising sulfo groups,
  a3) 3 to 60% by weight of at least one nonionic monomer of the formula (I)

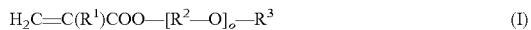

$$H_2C=C(R^1)COO-[R^2-O]_o-R^3 \qquad (I)$$

in which $R^1$ is hydrogen or methyl, $R^2$ are identical or different, linear or branched $C_2$-$C_6$-alkylene radicals which may be arranged in blocks or randomly, and $R^3$ is hydrogen or a straight-chain or branched $C_1$-$C_4$-alkyl radical and o is a natural number from 3 to 50,
  a4) 0 to 30% by weight of one or more further ethylenically unsaturated monomers which are polymerizable with a1), a2) and a3),
  where the sum of a1), a2), a3) and a4) adds up to 100% by weight,
b) 0 to 20% by weight of polycarboxylates other than component a),
c) 0 to 50% by weight of complexing agents,
d) 0 to 70% by weight of phosphates,
e) 0 to 60% by weight of further builders and cobuilders,
f) 0.1 to 20% by weight of nonionic surfactants,
g) 0 to 30% by weight of bleaches and optionally bleach activators and bleach catalysts,
h) 0 to 8% by weight of enzymes,
i) 0 to 50% by weight of one or more further additives such as anionic or zwitterionic surfactants, alkali carriers, corrosion inhibitors, defoamers, dyes, fragrances, fillers, organic solvents and water,
wherein the sum of components a) to i) adds up to 100% by weight.

As component a1), the copolymer comprises 30 to 90% by weight of at least one monoethylenically unsaturated $C_3$-$C_8$-carboxylic acid, or of an anhydride or a salt thereof. Suitable water-soluble salts are, for example, the sodium and potassium salts of the carboxylic acids.

Suitable unsaturated $C_3$-$C_8$-carboxylic acids are especially acrylic acid, methacrylic acid, ethacrylic acid, vinylacetic acid, allylacetic acid, crotonic acid, maleic acid, fumaric acid, mesaconic acid and itaconic acid, and the water-soluble salts thereof. When the unsaturated $C_3$-$C_8$-carboxylic acids mentioned can form anhydrides, the latter are also suitable as monomers a1), for example maleic anhydride, itaconic anhydride and methacrylic anhydride.

The copolymer preferably comprises, as component a1), acrylic acid, methacrylic acid or the water-soluble salts thereof. Water-soluble salts are, for example, the sodium and potassium salts.

As component a2), the copolymer comprises 3 to 60% by weight of a monomer comprising sulfo groups.

Preferred monomers a2) are 2-acrylamido-2-methylpropanesulfonic acid, allylsulfonic acid or the salts thereof.

Suitable salts are generally water-soluble salts, preferably the sodium, potassium and ammonium salts of the acids mentioned.

As component a3), the copolymer comprises 3 to 60% by weight of at least one nonionic monomer of the formula (I)

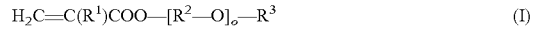

$$H_2C=C(R^1)COO-[R^2-O]_o-R^3 \qquad (I)$$

in which $R^1$ is hydrogen or methyl, $R^2$ is identical or different, linear or branched $C_2$-$C_6$-alkylene radicals which may be arranged in blocks or randomly, and $R^3$ is hydrogen or a straight-chain or branched $C_1$-$C_4$-alkyl radical and o is a natural number from 3 to 50.

The alkylene radicals may also be arranged in blocks and randomly, i.e. in one or more blocks of identical alkylene oxide radicals and additionally randomly in one or more blocks of two or more different alkylene oxide radicals. This is also included by the wording "arranged in blocks or randomly".

The nonionic monomer a3) comprises an average of 3 to 50, preferably 8 to 45, more preferably 10 to 45, especially 20 to 45, alkylene oxide units. For example, it may comprise an average of 22 or 44 alkylene oxide units. The index o is based on the mean number of alkylene oxide units.

Preferred alkylene oxide units $R^2$—O are ethylene oxide, 1,2-propylene oxide and 1,2-butylene oxide, particular preference being given to ethylene oxide and 1,2-propylene oxide.

In a specific embodiment, the nonionic monomers a3) comprise only ethylene oxide units.

$R^3$ is preferably methyl.

As component a4), the copolymer may comprise 0 to 30% by weight of one or more further ethylenically unsaturated monomers polymerizable with a1), a2) and a3).

Useful further ethylenically unsaturated monomers a4) include, for example, acrylamide, t-butylacrylamide, vinyl acetate, vinyl methyl ether, hydroxybutyl vinyl ether, 1-vinylpyrrolidone, 1-vinylcaprolactam, 1-vinylimidazole, 2-vinylpyridine, 4-vinylpyridine, methyl methacrylate, ethyl acrylate, isobutene, diisobutene, isoprenol, 1-alkenes such as 1-octene, N,N-dimethylacrylamide and styrene.

The proportion of copolymerized monomers a1), especially of copolymerized acrylic acid, methacrylic acid or of a water-soluble salt of these acids, is preferably 40 to 85% by weight and more preferably 47 to 83% by weight. The proportion of copolymerized 2-acrylamido-2-methylpropanesulfonic acid a2) is preferably 4 to 40% by weight, preferably 6 to 35% by weight and more preferably 8 to 32% by weight. The proportion of monomer units a3) of the formula (I) is preferably 4 to 35% by weight, more preferably 6 to 30% by weight.

If monomers a4) are present in the inventive copolymers, the proportion thereof is preferably up to 20% by weight, more preferably up to 15% by weight and especially up to 10% by weight.

The inventive copolymers a) generally have a mean molecular weight $M_w$ of 2000 to 200000 g/mol, preferably of 3000 to 100000 g/mol, more preferably of 10000 to 50000 g/mol, determined by gel permeation chromatography at room temperature with water as an eluent against polyacrylate standards.

The K values thereof are 15 to 100, preferably 20 to 80, more preferably 30 to 50, measured at pH 7 in 1% by weight aqueous solution at 25° C. according to H. Fikentscher, Cellulose-Chemie volume 13, pages 58 to 64 and 71 to 74 (1932).

The inventive copolymers can be prepared by free-radical polymerization of the monomers. It is possible to work by any known free-radical polymerization process. In addition to polymerization in bulk, mention should be made especially of the processes of solution polymerization and emulsion polymerization, preference being given to solution polymerization.

The polymerization is preferably performed in water as a solvent. However, it can also be undertaken in alcoholic solvents, especially $C_1$-$C_4$-alcohols, such as methanol, ethanol and isopropanol, or mixtures of these solvents with water.

Suitable polymerization initiators are compounds which decompose thermally or photochemically (photoinitiators) to form free radicals.

Also frequently used are redox initiator systems which consist of a peroxo compound, a metal salt and a reducing agent. Examples of suitable peroxo compounds are hydrogen peroxide, peroxodisulfate (as the ammonium, sodium or potassium salt), peroxosulfates, and organic peroxo compounds such as tert-butyl hydroperoxide, cumene hydroperoxide or dibenzoyl peroxide. Suitable metal salts are in particular iron(II) salts such as iron(II) sulfate heptahydrate. Suitable reducing agents are sodium sulfite, the disodium salt of 2-hydroxy-2-sulfinatoacetic acid, the disodium salt of 2-hydroxy-2-sulfonatoacetic acid, sodium hydroxymethanesulfinate, ascorbic acid, isoascorbic acid or mixtures thereof.

Among the thermally activable polymerization initiators, preference is given to initiators having a decomposition temperature in the range from 20 to 180° C., especially from 50 to 90° C. Examples of suitable thermal initiators are inorganic peroxo compounds such as peroxodisulfates (ammonium peroxodisulfate and preferably sodium peroxodisulfate), peroxosulfates, percarbonates and hydrogen peroxide; organic peroxo compounds such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl perneodecanoate, tert-butyl perbenzoate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxydicarbamate; azo compounds such as 2,2'-azobisisobutyronitrile, 2,2'-azobis(2-methylbutyronitrile) and azobis(2-amidopropane) dihydrochloride.

These initiators can be used in combination with reducing compounds as initiator/regulator systems. Examples of such reducing compounds include phosphorus compounds such as phosphorous acid, hypophosphites and phosphinates, sulfur compounds such as sodium hydrogensulfite, sodium sulfite and sodium formaldehydesulfoxylate, and hydrazine.

Examples of suitable photoinitiators are benzophenone, acetophenone, benzyl dialkyl ketones and derivatives thereof.

Preference is given to using thermal initiators, preference being given to inorganic peroxo compounds, especially sodium peroxodisulfate. The peroxo compounds are particularly advantageously used in combination with sulfur-containing reducing agents, especially sodium hydrogensulfite, as the redox initiator system. In the case of use of this initiator/regulator system, copolymers comprising —$SO_3^-$ $Na^+$ and/or —$SO_4^-Na^+$ as end groups are obtained, which are notable for exceptional cleaning power and scale-inhibiting action.

Alternatively, it is also possible to use phosphorus-containing initiator/regulator systems, for example hypophosphites/phosphinates.

The amounts of photoinitiator and initiator/regulator system should be matched to the substances used in each case. If, for example, the preferred peroxodisulfate/hydrogensulfite system is used, typically 2 to 6% by weight, preferably 3 to 5% by weight, of peroxodisulfate and generally 5 to 30% by weight, preferably 5 to 10% by weight, of hydrogensulfite are used, based in each case on the monomers a1), a2), a3) and optionally a4).

If desired, it is also possible to use polymerization regulators. Suitable examples are sulfur compounds such as mercaptoethanol, 2-ethylhexyl thioglycolate, thioglycolic acid and dodecyl mercaptan. When polymerization regulators are used, the amount thereof used is generally 0.1 to 15% by weight, preferably 0.1 to 5% by weight and more preferably 0.1 to 2.5% by weight, based on monomers a1), a2), a3) and optionally a4).

The polymerization temperature is generally 20 to 200° C., preferably 20 to 150° C. and more preferably 20 to 120° C.

The polymerization can be performed under atmospheric pressure, but is preferably undertaken in a closed system under the autogenous pressure which evolves.

The copolymers can be obtained in the acidic state, but they can also, if desired for the application, be neutralized or partly neutralized by addition of bases, especially of sodium hydroxide solution, as early as during the polymerization or after the polymerization has ended. The preferred pH of the aqueous copolymer solutions is in the range from 3 to 8.5.

The copolymers used in accordance with the invention can be used directly in the form of the aqueous solutions obtained in the course of preparation by means of solvent polymerization in water, or in dried form (obtained, for example, by spray drying, spray granulation, fluidized spray drying, roller drying or freeze drying).

In addition to component a), the inventive detergent formulations may comprise, as component b), 0 to 20% by weight of polycarboxylates other than component a). These may be hydrophilically or hydrophobically modified.

If polycarboxylates other than component a) are present, they are generally present in amounts of 0.1 to 20% by weight.

Suitable examples are alkali metal salts of homo- and copolymers of acrylic acid or of methacrylic acid. Suitable for copolymerization are monoethylenically unsaturated dicarboxylic acids such as maleic acid, fumaric acid, maleic anhydride, itaconic acid and citraconic acid. A suitable polymer is especially polyacrylic acid, which preferably has a molar mass of 2000 to 40000 g/mol. Due to its superior solubility, among this group, preference may be given to short-chain polyacrylic acid which has molar masses of 2000 to 10000 g/mol, especially 3000 to 8000 g/mol. Additionally suitable are copolymeric polycarboxylates, especially those of acrylic acid with methacrylic acid and of acrylic acid or methacrylic acid with maleic acid and/or fumaric acid.

It is also possible to use copolymers of at least one monomer from the group consisting of monoethylenically unsaturated $C_3$-$C_{10}$-mono- or dicarboxylic acids or anhydrides thereof, such as maleic acid, maleic anhydride, acrylic acid, methacrylic acid, fumaric acid, itaconic acid and citraconic acid with at least one hydrophilically or hydrophobically modified monomer, as enumerated hereinafter.

Suitable hydrophobic monomers are, for example, isobutene, diisobutene, butene, pentene, hexene and styrene, olefins having 10 or more carbon atoms or mixtures thereof, for example 1-decene, 1-dodecene, 1-tetradecene, 1-hexadecene, 1-octadecene, 1-eicosene, 1-docosene, 1-tetracosene and 1-hexacosene, $C_{22}$-alpha-olefin, a mixture of $C_{20}$-$C_{24}$-alpha-olefins and polyisobutene having an average of 12 to 100 carbon atoms.

Suitable hydrophilic monomers are monomers with sulfonate or phosphonate groups, and nonionic monomers with a hydroxyl function or alkylene oxide groups. Examples include: allyl alcohol, isoprenol, methoxy polyethylene glycol (meth)acrylate, methoxy polypropylene glycol (meth)acrylate, methoxy polybutylene glycol (meth)acrylate, methoxy poly(propylene oxide-co-ethylene oxide) (meth)acrylate, ethoxy polyethylene glycol (meth)acrylate, ethoxy polypropylene glycol (meth)acrylate, ethoxy polybutylene glycol (meth)acrylate and ethoxy poly(propylene oxide-co-ethylene oxide) (meth)acrylate. The polyalkylene glycols comprise 3 to 50, especially 5 to 40 and in particular 10 to 30 alkylene oxide units.

Particularly preferred sulfo-containing monomers are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropane-sulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of the acids mentioned, such as the sodium, potassium or ammonium salts thereof.

Particularly preferred monomers containing phosphonate groups are vinylphosphonic acid and salts thereof.

Furthermore, it is also possible to additionally use amphoteric and cationic polymers.

As component c), the inventive detergent formulations may comprise 0 to 50% by weight of one or more complexing agents. If complexing agents are present, they are present in amounts of 0.1 to 50% by weight, preferably 1 to 45% by weight and more preferably 1 to 40% by weight. Preferred complexing agents are selected from the group consisting of nitrilotriacetic acid, ethylenediaminetetraacetic acid, diethylenetriaminepentaacetic acid, hydroxyethylethylenediaminetriacetic acid and methylglycinediacetic acid, glutamic acid-diacetic acid, iminodisuccinic acid, hydroxyiminodisuccinic acid, ethylenediaminedisuccinic acid, aspartic acid-diacetic acid, and salts thereof. Particularly preferred complexing agents c) are methylglycinediacetic acid and salts thereof.

As component d), the inventive detergent may comprise 0 to 70% by weight of phosphates. When the detergent comprises phosphates, it comprises them generally in amounts of 1 to 70% by weight, preferably of 5 to 60% by weight, more preferably of 20 to 55% by weight.

Among the multitude of commercially available phosphates, the alkali metal phosphates, with particular preference for pentasodium triphosphate or pentapotassium triphosphate (sodium tripolyphosphate or potassium tripolyphosphate), are of the greatest significance in the washing and cleaning products industry.

Suitable phosphates for dishwashing compositions are especially alkali metal phosphates and polymeric alkali metal phosphates, which may be present in the form of their alkaline, neutral or acidic sodium or potassium salts. Examples of such phosphates are trisodium phosphate, tetrasodium diphosphate, disodium dihydrogendiphosphate, pentasodium tripolyphosphate, what is called sodium hexametaphosphate, oligomeric trisodium phosphate with a degree of oligomerization of 5 to 1000, preferably 5 to 50, and the corresponding potassium salts, or mixtures of sodium hexametaphosphate and the corresponding potassium salts, or mixtures of the sodium and potassium salts. Especially preferred are tripolyphosphate salts.

As component e), the inventive detergent may comprise 0 to 60% by weight of builders and cobuilders. When the detergent comprises builders and cobuilders, it comprises them generally in amounts of 0.1 to 60% by weight. Builders and cobuilders are water-soluble or water-insoluble substances, the main task of which consists in the binding of calcium and magnesium ions.

These may be low molecular weight carboxylic acids and salts thereof, such as alkali metal citrates, especially anhydrous trisodium citrate or trisodium citrate dihydrate, alkali metal succinates, alkali metal malonates, fatty acid sulfonates, oxidisuccinate, alkyl or alkenyl disuccinates, gluconic acids, oxadiacetates, carboxymethyloxysuccinates, tartrate monosuccinate, tartrate disuccinate, tartrate monoacetate, tartrate diacetate and α-hydroxypropionic acid.

A further substance class with cobuilder properties which may be present in the inventive detergents is that of the phosphonates. These are especially hydroxyalkane- or aminoalkanephosphonates. Among the hydroxyalkanephosphonates, 1-hydroxyethane-1,1-diphosphonate (HEDP) is of particular significance as a cobuilder. It is preferably used in the form of the sodium salt, the disodium salt being neutral and the tetrasodium salt alkaline (pH 9). Useful aminoalkanephosphonates preferably include ethylenediaminetetramethylenephosphonate (EDTMP), diethylenetriaminepentamethylenephosphonate (DTPMP) or the higher homologs thereof. They are preferably used in the form of the neutral sodium salts, for example as the hexasodium salt of EDTMP or as the hepta- and octasodium salt of DTPMP. The builder used from the class of the phosphonates is preferably HEDP. The aminoalkanephosphonates additionally have marked heavy metal binding capacity. Accordingly, especially when the compositions also comprise bleaches, it may be preferable to use aminoalkanephosphonates, especially DTPMP, or to use mixtures of the phosphonates mentioned.

A further substance class in the builder system is that of the silicates. Crystalline sheet-type silicates with the general formula $NaMSi_xO_{2x+1} \cdot yH_2O$ may be present, where M is sodium or hydrogen, x is from 1.9 to 22, preferably from 1.9 to 4, particularly preferred values for x being 2, 3 or 4, and y is from 0 to 33, preferably 0 to 20. In addition, amorphous sodium silicates with an $SiO_2:Na_2O$ ratio of 1 to 3.5, preferably of 1.6 to 3 and especially of 2 to 2.8 can be used.

In addition, carbonates and hydrogencarbonates are used, among which the alkali metal salts, especially sodium salts, are preferred.

As component f), the inventive detergent formulations comprise 0.1 to 20% by weight of nonionic surfactants, typically weakly foaming or low-foaming nonionic surfactants. These are present preferably in proportions of 0.1 to 15% by weight, more preferably of 0.25 to 10% by weight.

Suitable nonionic surfactants comprise the surfactants of the general formula (III)

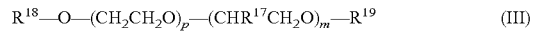

in which $R^{18}$ is a linear or branched alkyl radical having 8 to 22 carbon atoms, $R^{17}$ and $R^{19}$ are each independently hydrogen or a linear or branched alkyl radical having 1-10 carbon atoms or H, where $R^{17}$ is preferably methyl, and p and m are each independently 0 to 300. Preferably, p=1-100 and
m=0-30.

The surfactants of the formula (III) may be either random copolymers or block copolymers, preferably block copolymers.

In addition, it is possible to use di- and multiblock copolymers formed from ethylene oxide and propylene oxide, which are commercially available, for example, under the Pluronic® (BASF SE) or Tetronic® (BASF Corporation) name. In addition, it is possible to use reaction products formed from sorbitan esters with ethylene oxide and/or propylene oxide. Likewise suitable are amine oxides or alkyl glycosides. An overview of suitable nonionic surfactants is given by EP-A 851 023 and DE-A 198 19 187.

It is also possible for mixtures of several different nonionic surfactants to be present.

As component g), the inventive detergent formulations may comprise 0 to 30% by weight of bleaches, optionally bleach activators and optionally bleach catalysts. If the detergent formulations comprise bleaches, bleach activators or bleach catalysts, they comprise the latter in amounts totaling 0.1 to 30% by weight, preferably 1 to 30% by weight and more preferably 5 to 30% by weight.

Bleaches are divided into oxygen bleaches and chlorine bleaches. Oxygen bleaches used include alkali metal perborates and the hydrates thereof, and alkali metal percarbonates.

Preferred bleaches in this context are sodium perborate in the form of the mono- or tetrahydrate, sodium percarbonate or the hydrates of sodium percarbonate.

Likewise usable as oxygen bleaches are persulfates and hydrogen peroxide.

Typical oxygen bleaches are also organic peracids, for example perbenzoic acid, peroxy-alpha-naphthoic acid, peroxylauric acid, peroxystearic acid, phthalimidoperoxycaproic acid, 1,12-diperoxydodecanedioic acid, 1,9-diperoxyazelaic acid, diperoxoisophthalic acid or 2-decyldiperoxybutane-1,4-dioic acid.

In addition, the following oxygen bleaches may also find use in the detergent formulation:

Cationic peroxy acids described in U.S. Pat. No. 5,422,028, U.S. Pat. No. 5,294,362 and U.S. Pat. No. 5,292,447, and sulfonyl peroxy acids described in U.S. Pat. No. 5,039,447.

Chlorine bleaches and the combination of chlorine bleaches with peroxidic bleaches can likewise be used. Known chlorine bleaches are, for example, 1,3-dichloro-5,5-dimethylhydantoin, N-chlorosulfamide, chloramine T, dichloramine T, chloramine B, N,N'-dichlorobenzoylurea, dichloro-p-toluenesulfonamide or trichloroethylamine. Preferred chlorine bleaches are sodium hypochlorite, calcium hypochlorite, potassium hypochlorite, magnesium hypochlorite, potassium dichloroisocyanurate or sodium dichloroisocyanurate.

Chlorine bleaches are used in amounts of generally 0.1 to 20% by weight, preferably of 0.2 to 10% by weight, more preferably of 0.3 to 8% by weight, based on the overall detergent formulation.

It is additionally possible to add small amounts of bleach stabilizers, for example phosphonates, borates, metaborates, metasilicates or magnesium salts.

Bleach activators are compounds which, under perhydrolysis conditions, give rise to aliphatic peroxocarboxylic acids having preferably 1 to 10 carbon atoms, especially 2 to 4 carbon atoms, and/or substituted perbenzoic acid. Suitable compounds are those which comprise one or more N- or O-acyl groups and/or optionally substituted benzoyl groups, for example substances from the class of the anhydrides, esters, imides, acylated imidazoles or oximes. Examples are tetraacetylethylenediamine (TAED), tetraacetylmethylenediamine (TAMD), tetraacetylglycoluril (TAGU), tetraacetylhexylenediamine (TAHD), N-acylimides, for example N-nonanoylsuccinimide (NOSI), acylated phenolsulfonates, for example n-nonanoyl- or isononanoyloxybenzenesulfonates (n- or iso-NOBS), pentaacetylglucose (PAG), 1,5-diacetyl-2,2-dioxohexahydro-1,3,5-triazine (DADHT) or isatoic anhydride (ISA).

Likewise suitable as bleach activators are nitrile quats, for example N-methyl-morpholinioacetonitrile salts (MMA salts) or trimethylammonioacetonitrile salts (TMAQ salts).

Preferentially suitable bleach activators are those from the group consisting of polyacylated alkylenediamines, more preferably TAED, N-acylimides, more preferably NOSI, acylated phenolsulfonates, more preferably n- or iso-NOBS, MMA and TMAQ.

Bleach activators are used in amounts of generally 0.1 to 10% by weight, preferably of 1 to 9% by weight, more preferably of 1.5 to 8% by weight, based on the overall detergent formulation.

In addition to the conventional bleach activators or in their stead, it is also possible for what are called bleach catalysts to be present. These substances are bleach-boosting transition metal salts or transition metal complexes, for example manganese-, iron-, cobalt-, ruthenium- or molybdenum-salen complexes or -carbonyl complexes. Usable bleach catalysts are also manganese, iron, cobalt, ruthenium, molybdenum, titanium, vanadium and copper complexes with nitrogen-containing tripod ligands, and cobalt-, iron-, copper- and ruthenium-amine complexes.

As component h), the inventive detergent formulations may comprise 0 to 8% by weight of enzymes. If the detergent formulations comprise enzymes, they comprise the latter generally in amounts of 0.1 to 8% by weight. It is possible to add enzymes to the detergent in order to enhance the performance of the detergents or to ensure the same quality of cleaning performance under milder conditions. The most frequently used enzymes include lipases, amylases, cellulases and proteases. In addition, it is possible, for example, also to use esterases, pectinases, lactases and peroxidases.

In addition, the inventive detergents may comprise, as component i), from 0 to 50% by weight of one or more further additives such as anionic or zwitterionic surfactants, alkali carriers, corrosion inhibitors, defoamers, dyes, fragrances, fillers, organic solvents, tabletting aids, disintegrants, thickeners, solubilizers and water. If the detergent formulation comprises further additives, they are generally present in amounts of 0.1 to 50% by weight.

The formulations may comprise anionic or zwitterionic surfactants, preferably in a blend with nonionic surfactants. Suitable anionic and zwitterionic surfactants are specified in EP-A 851 023 and DE-A 198 19 187.

As further constituents of the detergent formulation, alkali carriers may be present. In addition to the ammonium or alkali metal carbonates, ammonium or alkali metal hydrogencarbonates and ammonium or alkali metal sesquicarbonates already mentioned for the builder substances, the alkali carriers used may also be ammonium or alkali metal hydroxides, ammonium or alkali metal silicates and ammonium or alkali metal metasilicates, and mixtures of the aforementioned substances.

The corrosion inhibitors used may be silver anticorrosives from the group of the triazoles, the benzotriazoles, the bisbenzotriazoles, the aminotriazoles, the alkylaminotriazoles and the transition metal salts or complexes.

To prevent glass corrosion, which is manifested by cloudiness, iridescence, streaks and lines on the glass, glass corrosion inhibitors are used. Preferred glass corrosion inhibitors are from the group of the magnesium, zinc and bismuth salts and complexes.

Paraffin oils and silicone oils can optionally be used as defoamers and for protection of plastic and metal surfaces. Defoamers are generally used in proportions of 0.001% by weight to 5% by weight. In addition, it is possible to add dyes, for example patent blue, preservatives, for example Kathon CG, perfumes and other fragrances to the inventive detergent formulation.

An example of a suitable filler is sodium sulfate.

The inventive detergent formulations can be provided in liquid or solid form, in one or more phases, as tablets or in the form of other dosage units, in packaged or unpackaged form.

The invention is illustrated in detail by the examples which follow.

EXAMPLES

In all cases, the molecular weights were determined by means of gel permeation chromatography (GPC). This was done using 2 columns (Suprema Linear M) and a precolumn (Suprema precolumn), all of the Suprema-Gel brand (HEMA) from Polymer Standard Services (Mainz, Germany) at 35° C. with a flow rate of 0.8 ml/min. The eluent was the aqueous solution buffered at pH 7 with TRIS, to which 0.15M NaCl and 0.01M $NaN_3$ had been added. Calibration was effected with an Na-PAA standard, the integral molecular weight distribution curve of which had been determined by coupled SEC-laser light scattering, by the calibration method of M. J. R. Cantow et al. (J. Polym. Sci., A-1, 5(1967)1391-1394), but without the concentration correction proposed therein. All samples were adjusted to pH 7 with a 50% sodium hydroxide solution, a portion of this solution was diluted to a solids content of 1.5 mg/ml with demineralized water, and the mixture was stirred for 12 hours. The samples were subsequently filtered. In each case 100 µl were injected by means of a Sartorius Minisart RC 25 (0.2 µm).

Comparative Example C1

A reactor was initially charged with 503.9 g of demineralized water together with 2.36 g of a 50% by weight aqueous solution of phosphorous acid. Subsequently, the mixture was heated to internal temperature 100° C. under a nitrogen atmosphere. At this temperature, 58.9 g of a 10.0% by weight aqueous sodium peroxodisulfate solution, 39.2 g of a 40% by weight aqueous sodium bisulfite solution and 394.0 g of a mixture consisting of 10.9% by weight of distilled acrylic acid, 11.2% by weight of methoxy polyethylene glycol methacrylate ($M_w$=1086 g/mol), 11.9% by weight of distilled methacrylic acid, 4.5% by weight of 2-sulfoethylmethacrylic acid sodium salt and 61.5% by weight of demineralized water were simultaneously metered in separated and in parallel while stirring. The monomer mixture was metered in within 5 hours, sodium peroxodisulfate within 5.25 hours and sodium bisulfite within 5 hours. This was followed by continued polymerization at 100° C. for another 2 hours. Thereafter, the mixture was cooled to room temperature and then 87.0 g of a 50% by weight aqueous sodium hydroxide solution were used to establish a pH of 7.2. The pH and K values, molecular weights $M_n$ and $M_w$ and the solids content were determined, and the product mixture was assessed visually.

Comparative Example C2

A reactor was initially charged with 904.6 g of demineralized water together with 2.36 g of a 50% by weight aqueous solution of phosphorous acid. Subsequently, the mixture was heated to internal temperature 100° C. under a nitrogen atmosphere. At this temperature, 117.8 g of a 10.2% by weight aqueous sodium peroxodisulfate solution, 78.4 g of a 40% by weight aqueous sodium bisulfite solution and 647.2 g of a mixture consisting of 13.3% by weight of distilled acrylic acid, 13.7% by weight of methoxy polyethylene glycol methacrylate ($M_w$=1086 g/mol), 14.5% by weight of distilled methacrylic acid and 58.5% by weight of demineralized water and 140.8 g of a 25% by weight sodium vinylsulfonate solution were simultaneously metered in separated and in parallel while stirring. The monomer mixture was metered in within 5 hours, sodium peroxodisulfate within 5.25 hours and sodium bisulfite within 5 hours. This was followed by continued polymerization at 100° C. for another 2 hours. Thereafter, the mixture was cooled to room temperature and then 178.8 g of a 50% by weight aqueous sodium hydroxide solution were used to establish a pH of 7.2. The pH and K values, molecular weights $M_n$ and $M_w$ and the solids content were determined, and the product mixture was assessed visually.

Example 1

A reactor was initially charged with 375.0 g of demineralized water and the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 150.0 g of a mixture consisting of 12.0% by weight of distilled methacrylic acid, 38.0% by weight of methoxy polyethylene glycol methacrylate ($M_w$=1086 g/mol) and 50.0% by weight of demineralized water, 1004.0 g of a mixture consisting of 44.8% by weight of distilled acrylic acid, 22.4% by weight of 2-acrylamido-2-methylpropanesulfonic acid, 0.002% by weight of 4-methoxyphenol, 17.5% by weight of a 25% by weight aqueous sodium hydroxide solution and 15.3% by weight of demineralized water were metered in simultaneously, separately and in parallel while stirring. The monomers were metered in within 4 hours, sodium peroxodisulfate within 4.75 hours and sodium bisulfite within 4 hours. After the end of the acrylic acid feed, 150.0 g of a 25% by weight aqueous sodium hydroxide solution were added at internal temperature 90° C. within 2 hours. This was followed by continued polymerization at 90° C. for another 1 hour. Thereafter, the mixture was cooled to room temperature and 115.5 g of a 50% by weight aqueous sodium hydroxide solution were used to establish a pH of 4.5 in the polymer solution. The pH and K values, molecular weights $M_n$ and $M_w$ and the solids content were determined, and the product mixture was assessed visually.

Example 2

A reactor was initially charged with 375.0 g of demineralized water. Subsequently, the initial charge was heated to internal temperature 90° C. under a nitrogen atmosphere. At this temperature, 321.4 g of a 7% by weight aqueous sodium peroxodisulfate solution, 60.0 g of a 40% by weight aqueous sodium bisulfite solution, 300.0 g of a mixture consisting of 18.0% by weight of distilled methacrylic acid, 57.0% by weight of methoxy polyethylene glycol methacrylate ($M_w$=1086 g/mol) and 25.0% by weight of demineralized water, 853.0 g of a mixture consisting of 35.2% by weight of distilled acrylic acid, 26.4% by weight of 2-acrylamido-2-methylpropanesulfonic acid, 0.002% by weight of 4-methoxyphenol, 20.4% by weight of a 25% by weight aqueous sodium hydroxide solution and 18.0% by weight of demineralized water were metered in simultaneously, separately and in parallel while stirring. The monomers were metered in within 4 hours, sodium peroxodisulfate within 4.75 hours and sodium bisulfite within 4 hours. After the end of the acrylic acid feed, 150.0 g of a 25% by weight aqueous sodium hydroxide solution were added at internal temperature 90° C. within 2 hours. This was followed by continued polymerization at 90° C. for 1 hour. Thereafter, the polymer solution was cooled to room temperature and 67.3 g of a 50% by weight aqueous sodium hydroxide solution were used to establish a pH of 4.5. The pH and K values, molecular weights $M_n$ and $M_w$ and the solids content were determined, and the product mixture was assessed visually.

Example 3

A reactor was initially charged with 375.0 g of demineralized water. Subsequently, the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 225.0 g of a mixture consisting of 15.8% by weight of destilled methacrylic acid, 50.2% by weight of methoxy polyethylene glycol methacrylate ($M_w$=1086 g/mol) and 33.0% by weight of demineralized water, 869.4 g of a mixture consisting of 51.8% by weight of distilled acrylic acid, 17.2% by weight of 2-acrylamido-2-methylpropanesulfonic acid, 0.002% by weight of 4-methoxyphenol, 13.4% by weight of a 25% by weight aqueous sodium hydroxide solution and 17.6% by weight of demineralized water were metered in simultaneously, separately and in parallel while stirring. The monomers were metered in within 4 hours, sodium peroxodisulfate within 4.75 hours and sodium bisulfite within 4 hours. After the end of the acrylic acid feed, 150.0 g of a 25% by weight aqueous sodium hydroxide solution were added at internal temperature 90° C. within 2 hours. This was followed by continued polymerization at 90° C. for 1 hour. Thereafter, the polymer solution was cooled to room temperature and 115.5 g of a 50% by weight aqueous sodium hydroxide solution were used to establish a pH of 4.5. The pH and K values, molecular weights $M_n$ and $M_w$ and the solids content were determined, and the product mixture was assessed visually.

Example 4

A reactor was initially charged with 375.0 g of demineralized water and the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 113.0 g of a mixture consisting of 15.8% by weight of destilled methacrylic acid, 50.2% by weight of methoxy polyethylene glycol methacrylate ($M_w$=1086 g/mol) and 33.0% by weight of demineralized water, 809.7 g of a mixture consisting of 74.1% by weight of distilled acrylic acid, 9.4% by weight of 2-acrylamido-2-methylpropanesulfonic acid, 0.002% by weight of 4-methoxyphenol, 7.2% by weight of a 25% by weight aqueous sodium hydroxide solution and 9.3% by weight of demineralized water were metered in simultaneously, separately and in parallel while stirring. The monomers were metered in within 4 hours, sodium peroxodisulfate within 4.75 hours and sodium bisulfite within 4 hours. After the end of the acrylic acid feed, 150.0 g of a 25% by weight aqueous sodium hydroxide solution were added at internal temperature 90° C. within 2 hours. This was followed by continued polymerization at 90° C. for 1 hour. Thereafter, the polymer solution was cooled to room temperature and 115.5 g of a 50% by weight aqueous sodium hydroxide solution were used to establish a pH of 4.5. The pH and K values, molecular weights $M_n$ and $M_w$ and the solids content were determined, and the product mixture was assessed visually.

Example 5

A reactor was initially charged with 375.0 g of demineralized water and the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 150.0 g of a 50% by weight aqueous methoxy polyethylene glycol methacrylate ($M_w$=1086 g/mol) solution and 1004.0 g of a mixture consisting of 44.8% by weight of distilled acrylic acid, 22.4% by weight of 2-acrylamido-2-methylpropanesulfonic acid, 0.001% by weight of 4-methoxyphenol, 17.5% by weight of a 25% by weight aqueous sodium hydroxide solution and 15.3% by weight of demineralized water were metered in simultaneously, separately and in parallel while stirring. The monomers were metered in within 4 hours, sodium peroxodisulfate within 4.75 hours and sodium bisulfite within 4 hours. After the end of the initiator feed, 150.0 g of a 25% by weight aqueous sodium hydroxide solution were added at internal temperature 90° C. within 2 hours. This was followed by continued polymerization at 90° C. for 1 hour. Thereafter, the polymer solution was cooled to room temperature and 115.5 g of a 50% by weight aqueous sodium hydroxide solution were used to establish a pH of 4.5. The pH and K values, molecular weights $M_n$ and $M_w$ and the solids content were determined, and the product mixture was assessed visually.

Example 6

A reactor was initially charged with 375.0 g of demineralized water. Subsequently, the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 150.0 of a 50% by weight aqueous methoxy polyethylene glycol methacrylate solution ($M_w$=2086 g/mol) and 1004.0 g of a mixture consisting of 44.8% by weight of distilled acrylic acid, 22.4% by weight of 2-acrylamido-2-methylpropanesulfonic acid, 0.002% by weight of 4-methoxyphenol, 17.5% by weight of a 25% by weight aqueous sodium hydroxide solution and 15.3% by weight of demineralized water were metered in simultaneously, separately and in parallel while stirring. The monomers were metered in within 4 hours, sodium peroxodisulfate within 4.75 hours and sodium bisulfite within 4 hours. After the end of the acrylic acid feed, 150.0 g of a 25% by weight aqueous sodium hydroxide solution were added at internal temperature 90° C. within 2 hours. This was followed by continued polymerization at 90° C. for 1 hours.

Thereafter, the mixture was cooled to room temperature and 115.5 g of a 50% by weight aqueous sodium hydroxide solution were used to establish a pH of 4.5 in the polymer solution. The pH and K values, molecular weights $M_n$ and $M_w$ and the solids content were determined, and the product mixture was assessed visually.

Example 7

A reactor was initially charged with 375.0 g of demineralized water and the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 150.0 g of a 50% by weight aqueous methoxy polyethylene glycol methacrylate ($M_w$=1086 g/mol) solution and 1004.0 g of a mixture consisting of 44.8% by weight of distilled acrylic acid, 22.4% by weight of 2-acrylamido-2-methylpropanesulfonic acid, 0.001% by weight of 4-methoxyphenol, 17.5% by weight of a 25% by weight aqueous sodium hydroxide solution and 15.3% by weight of demineralized water were metered in simultaneously, separately and in parallel while stirring. The monomers were metered in within 4 hours, sodium peroxodisulfate within 4.75 hours and sodium bisulfite within 4 hours. After the end of the initiator feed, 150.0 g of a 25% by weight aqueous sodium hydroxide solution were added at internal temperature 90° C. within 2 hours. This was followed by continued polymerization at 90° C. for 1 hour. Thereafter, the polymer solution was cooled to room temperature and 115.5 g of a 50% by weight aqueous sodium hydroxide solution were used to establish a pH of 4.5. The pH and K values, molecular weights $M_n$ and $M_w$ and the solids content were determined, and the product mixture was assessed visually.

solution and 15.3% by weight of demineralized water were metered in simultaneously, separately and in parallel while stirring. The monomers were metered in within 4 hours, sodium peroxodisulfate within 4.75 hours and sodium bisulfite within 4 hours. After the end of the acrylic acid feed, 150.0 g of a 25% by weight aqueous sodium hydroxide solution were added at internal temperature 90° C. within 2 hours. This was followed by continued polymerization at 90° C. for 1 hour. This was followed by cooling to room temperature and 115.5 g of a 50% by weight aqueous sodium hydroxide solution were used to establish a pH of 4.5. The pH and K values, molecular weights $M_n$ and $M_w$ and the solids content were determined, and the product mixture was assessed visually.

The composition of the polymers is reproduced in table 1.

TABLE 1

| Example | Monomer composition of the copolymer | Monomer proportions [% by wt.] |
|---------|--------------------------------------|-------------------------------|
| C1 | AS/MAS/SEMA/MPEGMA(1000) | 28.3:31.0:29.2:11.6 |
| C2 | AS/MAS/VS/MPEGMA(1000) | 28.3:31.0:29.2:11.6 |
| 1 | AS/MAS/AMPS/MPEGMA(1000) | 60.0:2.4:30.0:7.6 |
| 2 | AS/MAS/AMPS/MPEGMA(1000) | 40.0:7.2:30.0:22.8 |
| 3 | AS/MAS/AMPS/MPEGMA(1000) | 60.0:4.8:20.0:15.2 |
| 4 | AS/MAS/AMPS/MPEGMA(1000) | 80.0:2.4:10.0:7.6 |
| 5 | AS/AMPS/MPEGMA(1000) | 60:30:10 |
| 6 | AS/AMPS/MPEGMA(2000) | 60:30:10 |

AS = acrylic acid
MAS = methacrylic acid
AMPS = 2-acrylamido-2-methylpropylsulfonic acid
MPEGMA(1000) = methyl polyethylene glycol ether with an average of 22 ethylene oxide units
MPEGMA(2000) = methyl polyethylene glycol ether with an average of 44 ethylene oxide units The analytical data of the polymers are reproduced in table 2.

TABLE 2

| Example | Solids content [%][a] | K value[b] (pH 7) | pH (tq) | Mw[c] | Visual assessment |
|---------|------------------------|--------------------|---------|--------|-------------------|
| C1 | 18.1 | 31.9 | 7.2 | 14 800 | Clear, pale yellowish, viscous solution |
| C2 | 18.8 | 22.3 | 7.2 | 5930 | Clear, pale yellowish, viscous solution |
| 1 | 41.1 | 42.6 | 4.5 | 22 400 | Clear, yellowish, viscous solution |
| 2 | 41.2 | 40.6 | 4.5 | 19 900 | Clear, yellowish, viscous solution |
| 3 | 41.6 | 45.9 | 4.6 | 26 400 | Clear, yellowish, viscous solution |
| 4 | 44.2 | 48.1 | 4.5 | 27 900 | Clear, yellowish, viscous solution |
| 5 | 40.3 | 40.0 | 4.5 | n.d. | Clear, colorless, viscous solution |
| 6 | 40.8 | 41.0 | 4.5 | n.d. | Clear, pale yellowish, viscous solution |

[a]ISO 3251, (0.25 g, 150° C., 2 h)
[b]determined by the Fikentscher method with a 1% solution in demineralized water
[c]determined by gel permeation chromatography Example 8

A reactor was initially charged with 375.0 g of demineralized water and the initial charge was heated to internal temperature 90° C. under a nitrogen atmosphere. At this temperature, 321.0 g of a 7% by weight aqueous sodium peroxodisulfate solution, 60.0 g of a 40% by weight aqueous sodium bisulfite solution, 150.0 g of a 50% by weight aqueous methoxy polyethylene glycol methacrylate ($M_w$=2086 g/mol) solution and 1004.0 g of a mixture consisting of 44.8% by weight of distilled acrylic acid, 22.4% by weight of 2-acrylamido-2-methylpropanesulfonic acid, 0.002% by weight of 4-methoxyphenol, 17.5% by weight of a 25% by weight aqueous sodium hydroxide solution and 15.3% by weight of demineralized water were The polymers were tested in the following phosphate-free formulations PF1 and PF2, and in the phosphate-based formulation P1. The composition of the test formulations is reproduced in table 3 (figures in % by weight).

TABLE 3

| | PF 1 | PF 2 | P1 |
|---|------|------|-----|
| Protease | 1 | 2 | 2 |
| Amylase | 0.2 | 0.5 | 0.5 |
| Surfactant | 5 | 5 | 4.5 |
| Polymer | 10 | 14 | 6.5 |
| Sodium percarbonate | 10.5 | 12.5 | 12.5 |
| Tetraacetylethylenediamine | 4 | 4 | 4 |

TABLE 3-continued

|  | PF 1 | PF 2 | P1 |
|---|---|---|---|
| Sodium disilicate | 2 | 5 | 4 |
| Sodium tripolyphosphate |  |  | 40 |
| Heavy soda | 18.8 | 25 | 25 |
| Sodium citrate dihydrate | 33 | 25 |  |
| Citric acid |  | 5 |  |
| Methylglycinediacetic acid | 15 | 0 |  |
| Hydroxyethane-(1,1-diphosphonic acid) | 0.5 | 2 | 1 |

Figures in % by weight

The following test conditions were observed:
Dishwasher: Miele G 1222 SCL
Program: 65° C. (with prewash)
Ware: 3 knives (WMF Berlin table knives, monobloc)
  3 Amsterdam drinking glasses, 0.2 l
  3 "OCEAN BLAU" BREAKFAST PLATES (MELAMINE)
  3 porcelain plates: FLAT RIMMED PLATES, 19 CM
Arrangement: knives in the cutlery drawer, glasses in the upper basket, plates sorted in the lower basket
Dishwasher detergent: 21 g
Addition of soil: 50 g of molten ballast soil is metered in with the formulation after the prewash, see below for composition
Rinse temperature: 65° C.
Water hardness: 21° dH (Ca/Mg):HCO3 (3:1):1.35
Rinse cycles: 15; with pause for 1 h between each (10 min with door open, 50 min with door closed)
Evaluation: visual after 15 rinse cycles The ware was assessed after 15 cycles in a darkened chamber under light behind an aperture plate, using a scale of marks from 10 (very good) to 1 (very poor). Marks of 1-10 were awarded both for spotting (very many intense spots=1 to no spots=10) and for scale the marks 1-10 (1=very high scale, 10=no scale).

Composition of the ballast soil:
Starch: 0.5% potato starch, 2.5% gravy
Fat: 10.2% margarine
Protein: 5.1% egg yolk, 5.1% milk
Others: 2.5% tomato ketchup, 2.5% mustard, 0.1% benzoic acid, 71.4% water Result:
Especially on glass and knives, the inventive copolymers exhibited an improved efficacy compared to the comparative examples.

The tables which follow list the added marks for scale formation and spotting on knives and drinking glasses.

Phosphate-Free Formulation PF1

| Polymer | Knives (S + B) | Glasses (S + B) | Total (max 40) |
|---|---|---|---|
| C1 | 12 | 12 | 24 |
| C2 | 11 | 11 | 22 |
| 1 | 13 | 13 | 26 |
| 2 | 13 | 15 | 28 |
| 3 | 14 | 14 | 28 |
| 4 | 16 | 14 | 30 |
| 5 | 15 | 14 | 29 |
| 6 | 15 | 15 | 30 |

S = spotting
B = scale

Phosphate-Containing Formulation P1

| Polymer | Knives (S + B) | Glasses (S + B) | Total (max 40) |
|---|---|---|---|
| C1 | 19 | 12 | 31 |
| C2 | 18 | 13 | 31 |
| 2 | 19 | 13 | 32 |
| 3 | 19 | 16 | 35 |

The inventive polymers were also tested in the formulation PF2. With the formulation PF2 too, the inventive copolymers were better than the comparative polymers.

The invention claimed is:

1. A copolymer which comprises, in copolymerized form,
  a1) 30 to 90% by weight of a monomer selected from the group consisting of acrylic acid, methacrylic acid and water-soluble salts of acrylic acid and methacrylic acid,
  a2) 3 to 60% by weight of 2-acrylamido-2-methylpropanesulfonic acid and water-soluble salts thereof,
  a3) 3 to 60% by weight of at least one nonionic monomer of the formula (I)

$$H_2C=C(R^1)COO-[R^2-O]_o-R^3 \quad (I)$$

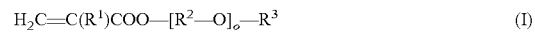

in which $R^1$ is hydrogen or methyl, $R^2$—O moieties are identical or different, are selected from ethylene oxide and 1,2-propylene oxide and may be arranged in blocks or randomly, and $R^3$ is hydrogen or a straight-chain or branched $C_1$-$C_4$-alkyl radical and o is a natural number from 20 to 45, and
  a4) 0 to 30% by weight of one or more further ethylenically unsaturated monomers which are polymerizable with a1), a2) and a3),
    where the sum of a1), a2), a3) and a4) does not exceed 100% by weight, and the copolymer has a K value of 40 to 48.1 measured at pH 7 as a 1.0 wt % aqueous solution at 25° C.

2. The copolymer according to claim 1, wherein $R^1$ in formula (I) is H.

3. The copolymer according to claim 1, wherein $R^1$ in formula (I) is methyl.

4. The copolymer according to claim 1, wherein $R^2$ in formula (I) is ethylene.

5. The copolymer according to claim 1, wherein $R^3$ in formula (I) is methyl.

6. The copolymer according to claim 1, comprising 40 to 85% by weight of a1), 4 to 40% by weight of a2) and 4 to 35% by weight of a3).

7. The copolymer according to claim 6, comprising 47 to 83% by weight of a1), 6 to 35% by weight of a2) and 6 to 30% by weight of a3).

8. The copolymer according to claim 7, wherein the $R^2$—O is ethyleneoxide, the 2-acrylamido-2-methylpropanesulfonic acid and water-soluble salts thereof is present from 10% to 30% by weight, and $R^3$ is methyl.

9. A detergent formulation comprising
  a) 1 to 20% by weight of at least one copolymer as defined in claim 1,
  b) 0 to 20% by weight of polycarboxylates other than component a),
  c) 0 to 50% by weight of complexing agents,
  d) 0 to 70% by weight of phosphates,
  e) 0 to 60% by weight of further builders and cobuilders,
  f) 0.1 to 20% by weight of nonionic surfactants,
  g) 0 to 30% by weight of bleaches and optionally bleach activators and bleach catalysts,
  h) 0 to 8% by weight of enzymes, i) 0 to 50% by weight of one or more further additives such as anionic or zwitterionic surfactants, alkali carriers, corrosion inhibitors, defoamers, dyes, fragrances, fillers, organic solvents, tabletting aids, disintegrants, thickeners, solubilizers and water, wherein the sum of components a) to i) does not exceed 100% by weight, and the detergent formulation is a machine dishwashing formulation.

10. The detergent as claimed in claim 9, wherein the 2-acrylamido-2-methylpropanesulfonic acid and water-soluble salts thereof is present from 10% to 30% by weight, $R^1$ is H or methyl,
$R^2$ is ethylene, and
$R^3$ is methyl.

11. The copolymer as claimed in claim 1, wherein the $R^2$—O moieties of formula (I) are arranged in blocks.

12. The copolymer as claimed in claim 1, wherein the $R^2$—O moieties of formula (I) are arranged randomly.

13. The copolymer as claimed in claim 1, comprising 47 to 83% by weight of a1), 6 to 35% by weight of a2) and 6 to 30% by weight of a3), and wherein the monomer a1) is acrylic acid, $R^1$ is hydrogen, and $R^2$—O is 1,2-propylene oxide.

14. A detergent formulation comprising:
a) 1 to 20% by weight of at least one copolymer as defined in claim 6,
b) 0 to 20% by weight of polycarboxylates other than component a),
c) 0 to 50% by weight of complexing agents,
d) 0 to 70% by weight of phosphates,
e) 0 to 60% by weight of further builders and cobuilders,
f) 0.1 to 20% by weight of nonionic surfactants,
g) 0 to 30% by weight of bleaches and optionally bleach activators and bleach catalysts,
h) 0 to 8% by weight of enzymes,
i) 0 to 50% by weight of one or more further additives such as anionic or zwitterionic surfactants, alkali carriers, corrosion inhibitors, defoamers, dyes, fragrances, fillers, organic solvents, tabletting aids, disintegrants, thickeners, solubilizers and water, wherein the sum of components a) to i) does not exceed 100% by weight, and the detergent formulation is a machine dishwashing formulation.

15. The detergent as claimed in claim 9, wherein component d) is 0% by weight, the machine dishwashing formulation being phosphate-free.

* * * * *